Inventor:
Heinz OPFERKUCH

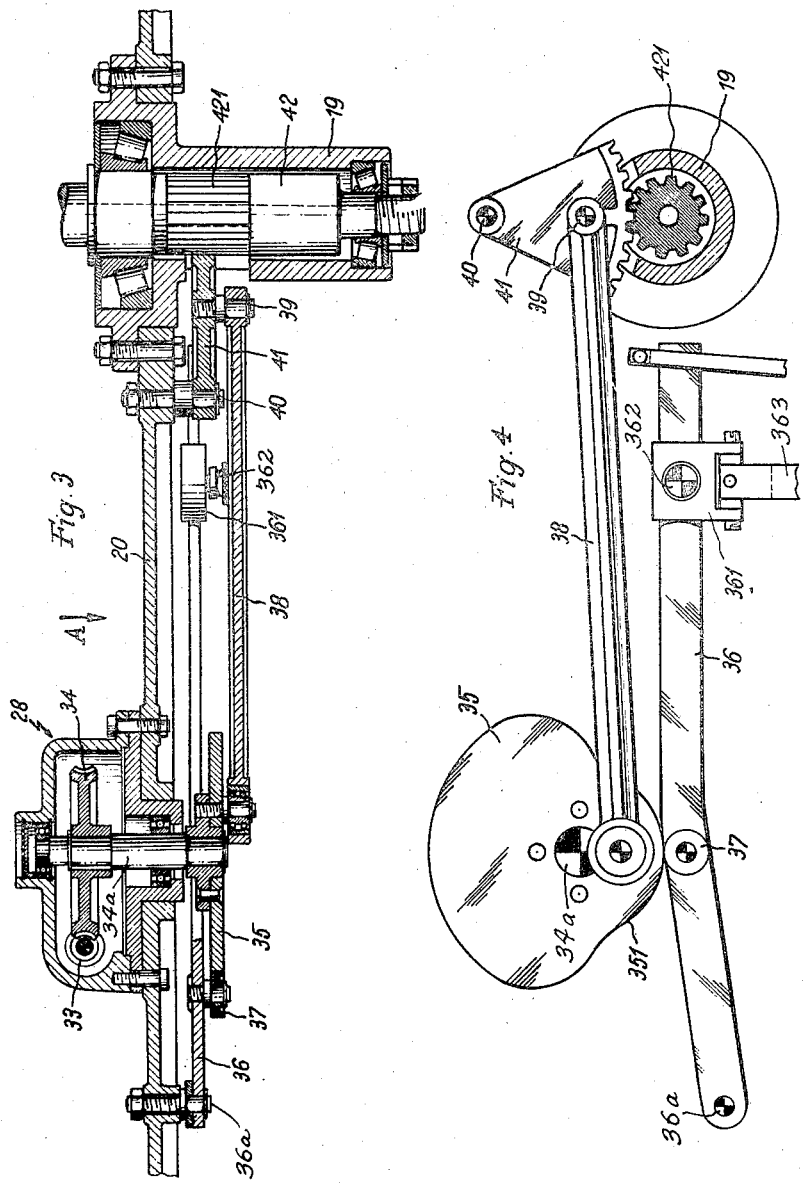

United States Patent Office 2,855,043
Patented Oct. 7, 1958

2,855,043

CUTTING MACHINE WITH FLEXIBLE ENDLESS BAND CUTTER AND OPERATING MEANS THEREFOR FOR CUTTING IN THREE DIMENSIONS

Heinz Opferkuch, Stuttgart-Bad Cannstatt, Germany

Application September 13, 1954, Serial No. 455,548

Claims priority, application Germany September 14, 1953

12 Claims. (Cl. 164—35)

The invention relates to a machine for cutting specimens, and more particularly to a machine for cutting bodies limited by cylindrical surfaces and consisting of a soft material delivered to the machine as a rod made of soft material such as felt, synthetic material having pores, and the like.

It is an object of the present invention to overcome the disadvantages of the known machines of the kind described hereinabove.

It is another object of the present invention to provide a machine having a cutting device which can be easily sharpened.

It is a further object of the present invention to provide a machine having cutting devices which need not be exchanged for every different diameter of the bodies to be cut.

Figure 5:
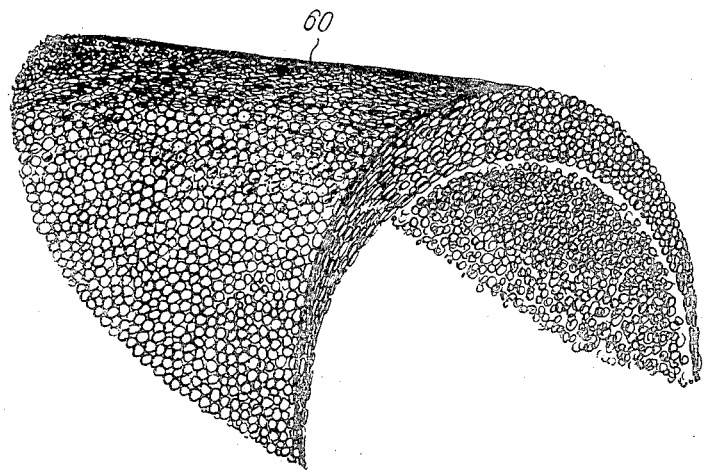

Other objects and advantages of the present invention will become apparent from the following detailed description thereof in connection with the accompanying drawings illustrating, by way of example, an embodiment of the present invention. In the drawings, Fig. 1 is a front elevation of a machine according to the invention, Fig. 2 is a side elevation of the machine shown in Fig. 1, Fig. 3 is a side elevation, partly in section, of parts of Fig. 1 shown on an enlarged scale, Fig. 4 is a plan view taken in the direction of the arrow A of Fig. 3, and Fig. 5 is a perspective view of a finished specimen.

Figure 1:
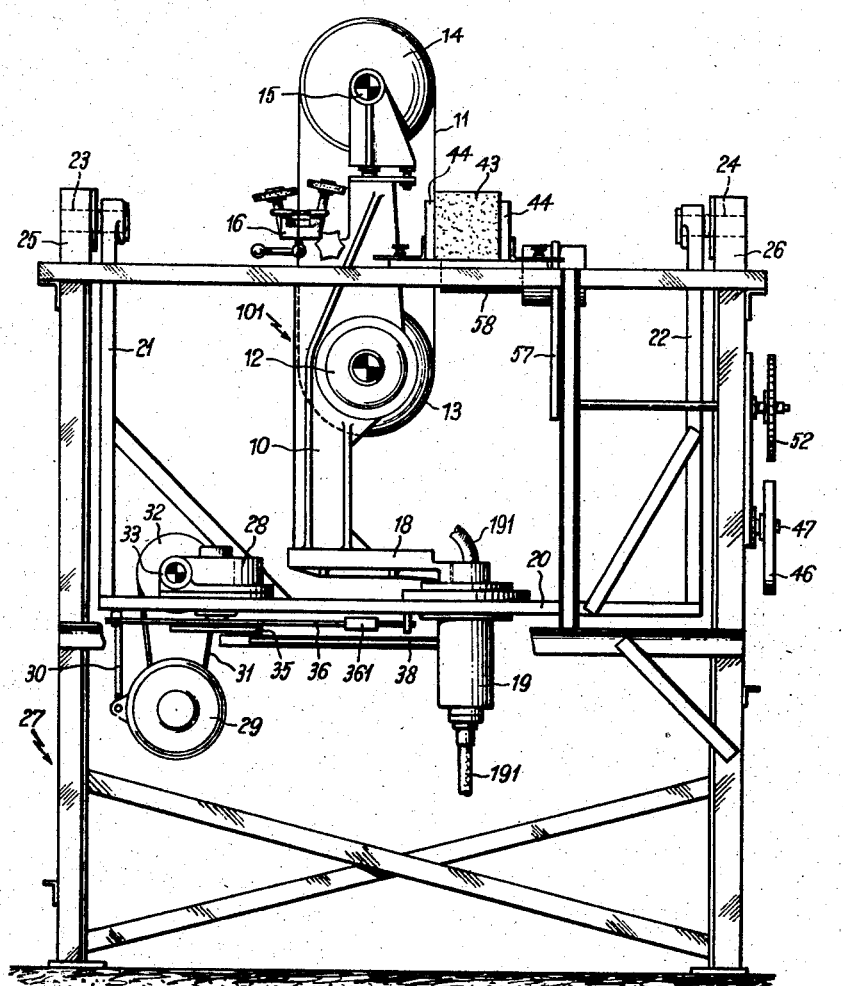
Figure 2:
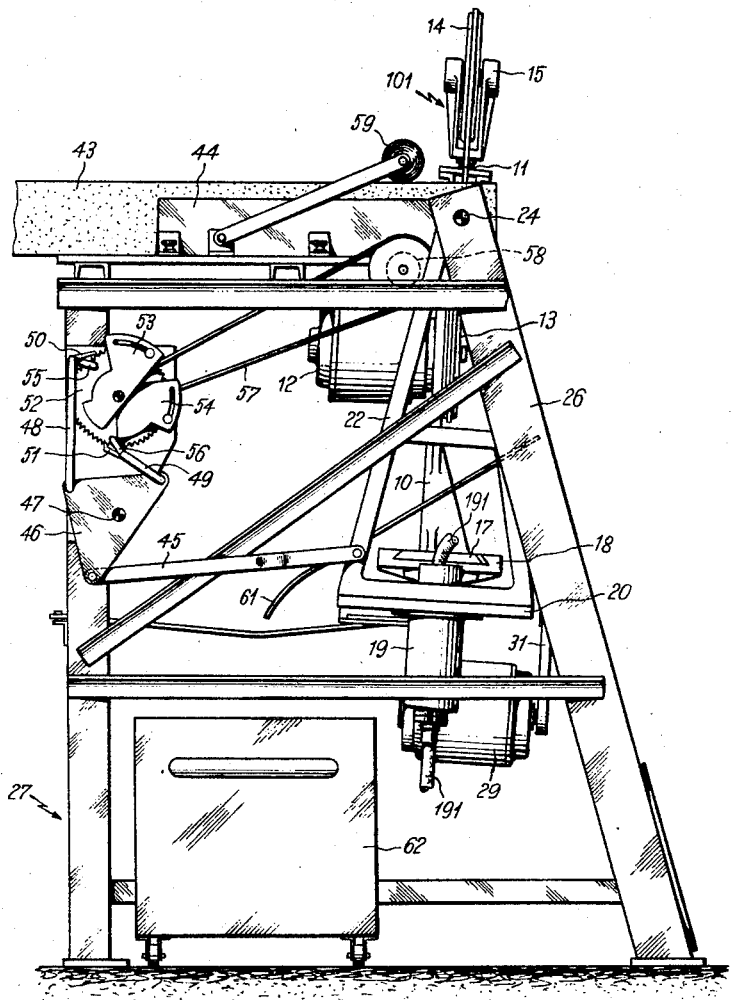

Referring now to the drawings and first to Figs. 1 and 2, the machine comprises a first frame 10 flanged to a motor 12 serving only for driving a band-shaped knife 11 which runs over a driving wheel 13 coupled with the shaft of the motor 12 and a further guide wheel 14 of the same size as the driving wheel 13 and being supported by a shaft 15. A sharpening device 16 for the knife 11 is screwed to the frame 10, so as to sharpen the band-shaped knife along both edges thereof.

The frame 10 is rigidly connected to a dovetail joint 17 supported by a bearing plate 18 rotatably supported (see Fig. 3) about a vertical axis by means of a trunnion or journal 42 arranged in a casing 19 rigidly connected with a tilting or rocking plate 20. A portion of a current supply line 191 for the motor 12 and a further motor 29 is shown where it is inserted in a centre bore of the trunnion 42.

The tilting or rocking plate 20 is suspended from the bilateral swinging or rocking frames 21 and 22 which are supported by means of trunnions 23 and 24 by the lateral frame parts 25 and 26 forming part of a frame 27 carrying all parts of the machine and, including a plurality of profiled members and struts.

The swinging or rocking plate 20 carries a housing 28 containing gear means for transmitting the oscillating and vibrating movement from a motor 29 (see also Fig. 3).

The motor 29 driving the gear 28 is suspended unilaterally by the stirrup 30 from the swinging or rocking plate 20 so as to act as a tension pulley or roller. The motor 29 rotates the drive wheel 32 driven by a driving belt 31 which is tightened by the weight of the motor 29.

As shown in Figs. 3 and 4, a worm gear 33 arranged on the shaft of the driving wheel 32 meshes with a gear 34 located in housing 28. To the shaft 34a of gear 34 a cam 35 is eccentrically keyed, so that the rotation of driving wheel 32 is transferred to the cam 35. The cam 35 has an outer cam surface 351, shown in Fig. 4, which makes contact with a follower roller 37.

The cam follower 37 is mounted on a lever 36, intermediate the ends of said lever. One end of lever 36 is mounted on a fixed portion of the machine frame 27 by a pivot pin 36a. The other end of the lever 36 is held by an adjusting device 361 which is also mounted on the machine frame 27.

The lever 36 is therefore held fixedly on the machine frame 27 relative to the rocking device formed of rocking plate 20 and rocking frames 21 and 22. As the cam 35 rotates, its cam surface 351 traverses the follower 37, and due to its eccentric mount and shape of its surface, the cam 35 alternately pushes its shaft 34a away from the follower 37 and then allows the shaft 34a to swing back toward follower 37 due to the weight of the rocking device. The cam shaft 34a in its movement carries with it the rocking device 20, 21 and 22, so that the latter is subjected to a tilting or rocking movement corresponding to the shape of cam 35. That is to say, the rocking device rocks forwardly and remains in this forward position during one half revolution of the cam 35, and then rocks rearwardly and remains in this rearward position during the other half revolution of cam 35. Fig. 4 shows the cam 35 in a position at the middle of the forward dwell period of the rocking device.

The angular disposition of lever 36 on its pivot 36a may be adjusted as desired by means of the adjusting device 361. The device 361 is in the nature of a bracket which is slidable along the length of lever 36 and is held in position by a set screw 362. The device 361 is pivotally mounted on the end of a pivot arm 363 which is pivotally mounted on the fixed frame 27. As the adjusting device is slid along the lever 36, the latter is pivoted on its pivot 36a which thereby varies the position of the follower 37. Thus the amplitude of the rocking motion carried out by the swinging or rocking device 20, 21, 22 may be regulated.

It will be observed that the pivotal axis of the rocking device 20, 21, 22 (defined by pivots 23, 24) extends horizontally substantially through the center of the material 43 to be cut. Thus, when the rocking device is tilted or rocked, the knife blade turns about an axis extending substantially through the center of the material 43.

A connecting rod 38 is eccentrically supported by the cam 35. The connecting rod 38 sets into a swinging motion a toothed segment 41 swingingly supported by a pin 40 secured to frame 20 and connected by the pivot 39 to the other end of the connecting rod 38. By the engagement of the teeth of the segment 41 with the teeth 421 provided on the trunnion 42 the latter is subjected to an alternating rocking motion which is transferred to the supporting plate 18 and to the assembly 101 of the band-shaped knife 11 (see Fig. 1 and particularly Figs. 3 and 4).

Fig. 2 of the drawings shows the rocking device 20, 21, 22 with the assembly 101 of the tape knife 11 in one end position of the pendulum formed by the parts 20, 21, 22. Fig. 2 shows particularly the means for effecting an automatic advance of a material 43 to be cut. The relatively long prismatic web 43 of material is guided laterally by the adjustable plates 44. The advance of the strand 43 is derived from the pendulum movement of the swinging or rocking device 20, 21, 22.

In order to accomplish this, a lever 45 is connected with one end thereof to the swinging or rocking frame 22, the other end of the lever 45 being connected to one corner of a triangular lever plate 46 supported for swinging or rocking motions about a pivot 47. The plate 46 transfers the swinging or rocking movements thereof by means of two connecting rods 48 and 49 attached to the two other corners of the plate 46. Two pawls 50 and 51 swingingly connected to the connecting rods 48 and 49, respectively, transfer the movement to a toothed plate 52, the plate 52 carrying out an intermittent unidirectional rotation. The magnitude of the advance movement of the strand 43 may be adjusted by two adjustable control discs 53 and 54 against which two control fingers 55 and 56 connected to the pawls 50 and 51 abut so that after having completed a certain adjustable path the fingers 55 and 56 lift the pawls 50 and 51 from the teeth of the disc 52. From this moment onward the motion of the plate 46 has no effect on the advance movement of the strand 43.

The intermittent rotational movement of the disc 52 is transferred by means of a chain drive 57 to the feed roller 58 feeding the material 43 to the band-shaped knife 11. A counter-roller 59 which, if desired, may be put under the pressure of a spring (not shown) presses the material 43 tightly against the feed roller 58 so that a positive feed is secured.

The pieces or specimens 60 (Fig. 5) cut from the material 43 fall over a chute or slide 61 secured to the frame 10 of the machine, into a portable receptacle 62. Instead of the chute 61 and the receptacle 62, the pieces or specimens may be transported by a conveyor belt (not shown).

The operation of this device is as follows:

The knife assembly 101 is driven by the motor 12. A web 43 of material is placed between the plates 44 and the rollers 58 and 59, and then the driving motor 29 is switched in so that by means of the driving belt 31 the driving gear 32 is rotated which in turn rotates over the worm gear 33 the toothed wheel 34.

The cam 35 is rotated together with the toothed wheel 34 and causes directly by the abutment of the curve 351 thereof against the roller 37 a pendulum movement of the knife assembly 101 so that the gradient of the end positions thereof and thus the boundary surfaces of the material 43 to be cut relatively to the axis of the specimens 60 (Fig. 5) are adjustable.

At the same time, the connecting rod 38 eccentrically supported by the cam 35 drives the toothed segment 41 always at the moments when the pendulum movements thereof are at a standstill so as to subject to reciprocating motions the trunnion 42 and the supporting plate 18 connected therewith. During the standstills of the advance motion and when the swinging frames 21, 22 are in their end positions, the knife aggregate 101 is rocked about the trunnion 42 and cuts the material 60 along a convex arc about the front end of the strand 43 of material. After this movement the knife 11 carries out a return motion along the same arc, however, owing to the movement of the swinging frames 21, 22 to the other end position thereof, with reversed inclination. During this movement the knife 11 cuts a wedge of material limited by cylindrical surfaces. During the next cycle of operation such a wedge is again produced, however with reverse direction of the pointed edge thereof.

By the pendulum and oscillating movements of the knife assembly 101 which follow each other continuously and owing to the automatically controlled advance of the raw material, specimens 60 (Fig. 5) are cut from the front end of the strand 43 without loss of material, said specimens 60 being limited by cylindrical surfaces including an acute angle with each other.

I have described preferred embodiments of my invention, but it should be understood that this disclosure is only for the purpose of illustration and that various omissions or changes in shape, proportion, and arrangement of parts, as well as the substitution of equivalent elements for those herein shown and described, may be made without departing from the spirit and scope of the invention set forth in the appended claims.

I claim:

1. A machine for cutting from an elongated block of soft material bodies limited by a cylindrical surface, comprising, in combination, means for feeding the soft material in a predetermined direction, a knife assembly, a band-shaped knife forming part of said knife assembly, having opposite edges being arranged substantially perpendicular to said predetermined direction of feeding the soft material, said opposite edges of said knife assembly being sharpened so as to cut said soft material, and means for guiding said band-shaped knife through a cutting zone in an arcuate path having a center situated on the side of the feeding of said material so as to cut an arcuate cross section through one end of said material, means for tilting the longitudinal axis of said knife relative to the plane of the material being fed, prior to the cutting stroke in said arcuate path, and drive means for actuating the feeding means intermittently during the period in which the knife is at the end of the arcuate path and out of contact with the material.

2. A machine for cutting bodies limited by two cylindrical surfaces including with each other an acute angle, comprising, in combination, a knife assembly, a band-shaped knife forming part of the knife assembly, said band-shaped knife cutting the body between the two cylindrical surfaces limiting the same, and a rocking device supporting said knife assembly, said rocking device having a horizontal pivotal axis arranged at right angles with respect to said rocking device, said pivotal axis being located substantially at the height of the median of the body to be cut, said knife assembly being turnably mounted on said rocking device, means for turning said knife assembly relative to the rocking device whereby the knife is moved in an arcuate cutting path through the body, and drive means for actuating the rocking device to tilt said knife when the knife reaches the end of each arcuate cutting path.

3. A machine for cutting bodies limited by two cylindrical surfaces including with each other an acute angle, comprising, in combustion, a knife assembly including a band-shaped knife for cutting the body along the two cylindrical surfaces limiting the same, a rocking device, the knife assembly being turnably mounted on the rocking device, a motor for rocking the rocking device and for turning the knife assembly, first connecting means connecting the motor to said rocking device and adapted to translate the rotational drive of said motor to rocking movement of said rocking device and the knife assembly carried thereby, and second connecting means connecting the motor to said knife assembly and adapted to translate the rotational drive of said motor to reciprocating turning movement of said knife assembly in opposite directions, relative to said rocking device.

4. A machine according to claim 3 in which the rocking device has two extreme rocking positions in which the knife is tilted in opposite directions, said second connecting means being operative to turn the knife assembly in one direction while the rocking device is in one extreme position and to turn the knife assembly in the opposite direction while the rocking device is in the other extreme position.

5. A machine according to claim 4 in which the machine has a fixed frame, the rocking device being mounted on said frame, said first connecting means including a cam driven by the motor, the cam having an arcuate cam surface which engages a fixed portion of said frame for tilting said rocking device in one direction during one-half of the revolution of said cam and in the opposite direction during the other half revolution of said cam.

6. A machine according to claim 5 in which the lever is adjustably mounted on the machine frame, the lever carrying a cam follower which engages the cam surface, the lever being adjustable to vary the lever ratio and the position of the cam follower and thereby vary the limit positions of the rocking device.

7. A machine according to claim 5 in which the second connecting means includes a connecting rod eccentrically mounted on the cam, the connecting rod being coupled to gear means for driving the knife assembly, and being mounted for reciprocal movement in a substantially longitudinal direction upon rotation of said cam, the reciprocating longitudinal movement of the connecting rod being translated into reciprocating turning movement of the gear means.

8. A machine according to claim 5 which also includes means for advancing material to be cut toward said knife, said advancing means comprising a ratchet device operative in one direction of rotation thereof, a feed roller engaging the material to be cut, the ratchet device operatively connecting said advancing means with the rocking device, said ratchet device having a member having operative and inoperative ratchet paths, and means for changing the length of said operative ratchet path of said member relative to the length of said inoperative ratchet path thereof.

9. A machine for cutting from an elongated block of soft material bodies limited by a cylindrical surface, comprising, in combination, a knife assembly including a band-shaped knife having opposite cutting edges, means for guiding the knife in an arcuate path through a cutting area, means for holding the block of material with its front end in said cutting area whereby the knife passes through the front of said material in said arcuate path to cut said bodies therefrom, means for feeding the block of material toward said cutting area while the knife is at the end of its arcuate path and out of contact with said material, the arcuate path having its center located in the direction from which the material is fed, and means for tilting said knife about an axis perpendicular to the direction of feed at the completion of each arcuate cut.

10. A machine for cutting from an elongated block of soft material bodies limited by a cylindrical surface, comprising, in combination, a knife assembly including a vertically disposed band-shaped knife having opposite cutting edges, means for guiding the knife in a horizontal arcuate path through a cutting area, means for holding the block of material with its front end in said cutting area whereby the knife passes through the front of said material in said arcuate path to cut said bodies therefrom, means for feeding the block of material horizontally in a direction toward said cutting area while the knife is at the end of its arcuate path and out of contact with said material, the arcuate path having its center spaced inwardly from the front surface of the material, and means for tilting said knife about a horizontal axis along a plane parallel to the direction of feed of said material at the completion of each arcuate cut.

11. A machine for cutting from a block of soft material bodies limited by convex and concave cylindrical surfaces forming an included angle therebetween, said machine comprising, in combination, a knife assembly including a band-shaped knife having opposite cutting edges, means for guiding the knife for movement in an arcuate path through a cutting zone in one direction and for return movement through an arcuate path in said cutting zone in the opposite direction, means for feeding the block of soft material in a direction toward said cutting zone when the knife is at the end of its return movement and out of contact with the material, both arcuate paths having their centers located in the direction from which the material is fed, and means for tilting said knife blade about an axis perpendicular to the direction of feed prior to the first arcuate movement of the knife, and for tilting the knife blade about said axis in a reverse direction prior to the return arcuate movement.

12. A machine for cutting from a block of soft material bodies limited by convex and concave cylindrical surfaces forming an included angle therebetween, said machine comprising, in combination, a knife assembly including a vertically disposed band-shaped knife having opposite cutting edges, means for guiding the knife in one direction in a horizontal arcuate path through a cutting zone, and for movement in a return arcuate path in said cutting zone in the opposite direction, means for feeding the block of soft material in a horizontal direction toward said cutting zone when the knife is at the end of its return movement and out of contact with the material, both arcuate paths having their centers located in the direction from which the material is fed, and means for tilting said knife about a horizontal axis along a plane parallel to the direction of feed of said material before the knife begins its movement through the first arcuate path, and for tilting the knife in the reverse direction in the same plane and about the same axis before the knife begins its movement through the return arcuate path.

References Cited in the file of this patent

UNITED STATES PATENTS

| | | |
|---|---|---|
| 406,225 | Metz | July 2, 1889 |
| 1,085,979 | Grob et al. | Feb. 3, 1914 |
| 1,303,680 | Kent | May 13, 1919 |